United States Patent
Snyder et al.

(10) Patent No.: US 10,227,924 B2
(45) Date of Patent: Mar. 12, 2019

(54) PARTICLE SEPARATOR

(71) Applicants: Rolls-Royce North American Technologies, Inc., Indianapolis, IN (US); University of Virginia Patent Foundation, Charlottesville, VA (US)

(72) Inventors: Philip H. Snyder, Avon, IN (US); Eric Loth, Charlottesville, VA (US); Dominic L. Barone, Hudson, OH (US)

(73) Assignees: Rolls-Royce North American Technologies Inc., Indianapolis, IN (US); University of Virginia Patent Foundation, Charlottesville, VA (US)

( * ) Notice: Subject to any disclaimer, the term of this patent is extended or adjusted under 35 U.S.C. 154(b) by 1098 days.

(21) Appl. No.: 14/460,925

(22) Filed: Aug. 15, 2014

(65) Prior Publication Data

US 2016/0363051 A1    Dec. 15, 2016

Related U.S. Application Data

(60) Provisional application No. 61/866,836, filed on Aug. 16, 2013.

(51) Int. Cl.
*F02C 7/00* (2006.01)
*F02C 7/052* (2006.01)
*B01D 45/06* (2006.01)

(52) U.S. Cl.
CPC ............ *F02C 7/052* (2013.01); *B01D 45/06* (2013.01); *F05D 2240/12* (2013.01); *F05D 2300/607* (2013.01)

(58) Field of Classification Search
CPC ... F02C 7/052; F02C 7/30; F02C 9/18; B01D 45/00; B01D 45/16; B01D 45/02; B01D 45/04; B01D 45/06; B01D 45/12; F05D 2260/607; F05D 2270/17; B64D 33/02
See application file for complete search history.

(56) References Cited

U.S. PATENT DOCUMENTS

| | | | | |
|---|---|---|---|---|
| 3,673,771 | A * | 7/1972 | Dickey ................. | B01D 45/08 415/121.2 |
| 4,255,174 | A * | 3/1981 | Simpson ............... | B01D 45/16 55/306 |
| 4,527,387 | A * | 7/1985 | Lastrina ................ | F02C 7/052 244/53 B |
| 4,928,480 | A | 5/1990 | Oliver et al. | |
| 5,139,545 | A | 8/1992 | Mann | |
| 6,698,180 | B2 | 3/2004 | Snyder | |

(Continued)

FOREIGN PATENT DOCUMENTS

| | | |
|---|---|---|
| EP | 2382026 A1 | 11/2011 |
| GB | 2270481 A | 3/1994 |

OTHER PUBLICATIONS

European Office Action, European Application No. 14181255.2-1607, dated Mar. 28, 2017, 6 pages.

(Continued)

*Primary Examiner* — Andrew Nguyen
(74) *Attorney, Agent, or Firm* — Barnes & Thornburg LLP

(57) ABSTRACT

An air-inlet duct includes an outer wall, an inner wall, and a splitter. The splitter cooperates with the outer wall to establish a particle separator which separates particles entrained in an inlet flow moving through the air-inlet duct to provide a clean flow of air to a compressor section of a gas turbine engine.

4 Claims, 7 Drawing Sheets

(56) References Cited

U.S. PATENT DOCUMENTS

| | | | |
|---|---|---|---|
| 7,296,395 B1 | 11/2007 | Hartman et al. | |
| 7,608,122 B2 | 10/2009 | Snyder | |
| 7,678,165 B2 | 3/2010 | Tingle et al. | |
| 7,708,122 B2 | 5/2010 | Plantan et al. | |
| 7,802,433 B2 | 9/2010 | Higgins | |
| 7,854,778 B2 | 12/2010 | Groom et al. | |
| 7,927,408 B2 | 4/2011 | Sheoran et al. | |
| 7,967,554 B2 | 6/2011 | Bremer | |
| 8,092,145 B2 | 1/2012 | Martel et al. | |
| 2005/0098038 A1 | 5/2005 | Blake et al. | |
| 2009/0078397 A1* | 3/2009 | Storey | F01K 23/068 165/146 |
| 2012/0131900 A1 | 5/2012 | Kenyon et al. | |
| 2013/0160411 A1* | 6/2013 | Mayer | F02C 7/052 55/418 |

OTHER PUBLICATIONS

European Office Action, European Application No. 14181255.2-1607, dated Oct. 16, 2015, 6 pages.

European Office Action, European Application No. 14181255.2-1607, dated May 6, 2016, 8 pages.

A.N. Smith and H. Babinsky; J.L. Fulker, P.R. Ashill, Normal shock wave-turbulent boundary-layer interactions in the presence of streamwise slots and grooves, The Aeronautical Journal, p. 493, Sep. 2002 (8 pages).

European Search Report and Written Opinion, European Application No. 14181255.2-1607, dated Oct. 1, 2014, 9 pages.

European Search Report issued in connection with European Patent Application No. 14181255.2, dated Oct. 16, 2015, 6 pages.

* cited by examiner

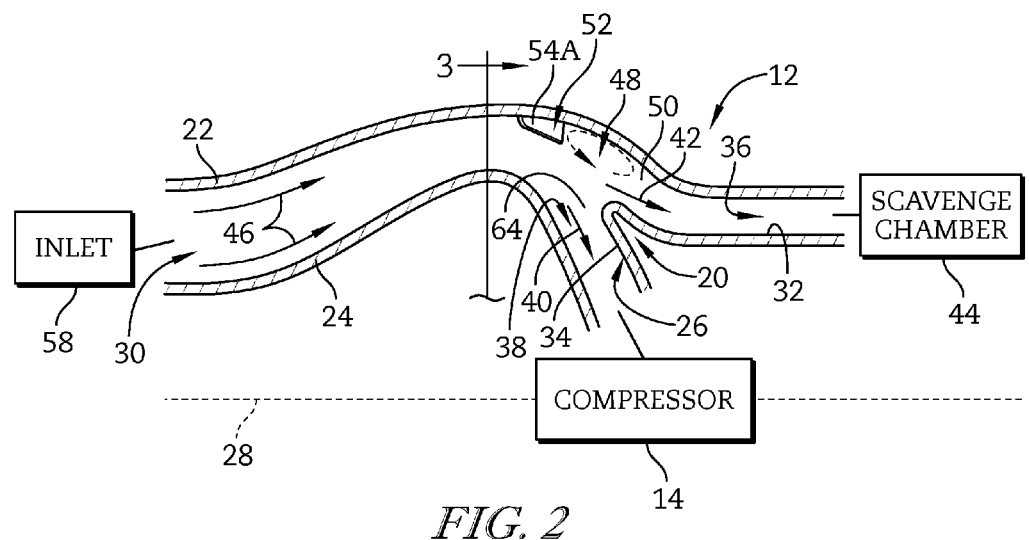
FIG. 2
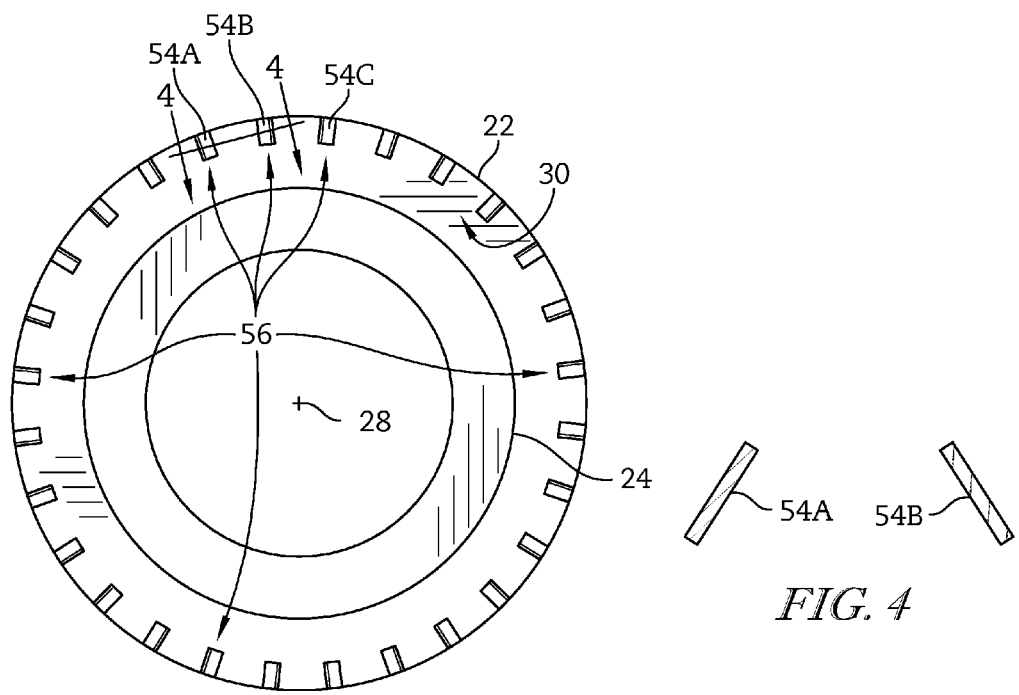
FIG. 3
FIG. 4

PARTICLE SEPARATOR

CROSS-REFERENCE TO RELATED APPLICATION

This application claims the benefit of and priority to U.S. Provisional Patent Application Ser. No. 61/866,836, filed Aug. 16, 2013, which is incorporated herein by this reference in its entirety.

FIELD OF THE DISCLOSURE

The present disclosure relates generally to gas turbine engines, and more specifically to particle separators included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, or liquid water and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel included in the air-inlet duct. In some instances, particles may deviate from the generally linear travel path and enter the engine channel rather than the scavenge channel. Particles may deviate from the generally linear travel path due separation of flow from an outer wall of the air-inlet duct leading to recirculation of the particles and/or other fluid flow phenomenon upstream of the scavenge channel.

SUMMARY

The present application discloses one or more of the features recited in the appended claims and/or the following features which, alone or in any combination, may comprise patentable subject matter.

An air-inlet duct may include an outer wall, an inner wall, and a splitter. The outer wall may be spaced apart from an engine rotation axis. The inner wall may be located between the outer wall and the engine rotation axis. Together, the inner wall and the outer wall may define an air-inlet passageway therebetween. The splitter may be located between the outer wall and the inner wall and may include an outer splitter surface cooperating with the outer wall to define a scavenge channel therebetween and an inner splitter surface cooperating with the inner wall to define an engine channel therebetween.

In some embodiments, the air-inlet duct may further include a flow regulator. The flow regulator may be configured to regulate a portion of an inlet flow including particles to cause a size and duration of a transient, time-varying, instantaneously-formed, separated flow region formed along the outer wall and upstream of a scavenge inlet to the scavenge channel to be minimized so that particles are collected in the scavenge channel and an amount of particles entering the engine channel are minimized.

In some embodiments, the flow regulator may include a series of flow control devices coupled to the outer wall to extend radially inward toward the engine rotation axis. Each flow control device may be arranged to lie in spaced-apart circumferential relation to one another and to locate the separated flow region between the series of flow control devices and the scavenge inlet.

In some embodiments, a first flow control device included in the series of flow control devices may be arranged to extend downstream toward the splitter. A second flow control device included in the series of flow control devices may be arranged to lie adjacent to the first flow control device and to extend downstream toward the splitter. The first and second flow control devices may be configured to converge toward one another as the first and second flow control devices extend toward the splitter.

In some embodiments, the flow regulator may include a series of flow control devices coupled to the outer wall to extend radially outwardly away from the engine rotation axis. Each flow control device may be arranged to lie in spaced-apart circumferential relation to one another and located upstream of the separated flow. Each flow control device is also configured to regulate in size, both average and instantaneous, the separated flow region.

In some embodiments, the flow regulator may include a series of flow control devices arranged to extend between and interconnect the outer wall and the outer splitter surface. Each flow control device may be arranged to extend upstream from the separated flow region and into the separated flow region and to lie in spaced-apart circumferential relation to one another.

In some embodiments, each flow control device may be further arranged to extend through a scavenge inlet and into the scavenge channel.

In some embodiments, the flow regulator may include a series of flow control devices coupled to the outer wall and arranged to extend toward the engine rotation axis. Each flow control device may be arranged to extend upstream from the separated flow region and into the separated flow region and to lie in spaced-apart circumferential relation to one another.

In some embodiments, each flow control device may be further arranged to extend through a scavenge inlet and into the scavenge channel.

In some embodiments, the flow regulator may include a series of flow control devices coupled to the outer splitter surface and arranged to extend away from the engine rotation axis toward the outer wall. Each flow control device may be arranged to extend into the separated flow region and into a scavenge inlet and to lie in spaced-apart circumferential relation to one another.

In some embodiments, each flow control device may be further arranged to extend through a scavenge inlet and into the scavenge channel.

In some embodiments, the flow regulator may include a set of movable flow diverters. The set of movable flow diverters may be located in the separated flow region between the outer wall and the splitter.

In some embodiments, the flow regulator may include a set of stationary flow diverters. The set of stationary flow diverters may be located in the separated flow region between the outer wall and the splitter.

In some embodiments, the flow regulator may include a set of stationary particle diverters. The set of stationary particle diverters may be located in spaced-apart relation to the outer wall and at an engine inlet into the engine channel.

In some embodiments, the flow regulator may include a set of movable particle diverters. The set of movable particle diverters may be located in spaced-apart relation to the outer wall and at an engine inlet to the engine channel.

In some embodiments, the flow regulator may include a set of movable flow diverters and a set of stationary particle diverters. The set of movable flow diverters may be located in the separated flow region between the outer wall and the splitter. The set of stationary particle diverters may be located in spaced-apart relation to the set of movable flow diverters at an engine inlet into the engine channel.

In some embodiments, the flow regulator may include an aperture formed in the outer wall upstream of the scavenge channel. The aperture may be configured to allow portions of a dirty stream to escape from the air-inlet duct adjacent the separated flow region.

In some embodiments, the flow regulator may include a series of axially spaced-apart apertures formed in the outer wall upstream of the scavenge channel. The series of apertures may be configured to allow portions of a dirty stream to escape from the air-inlet duct adjacent the separated flow region.

In some embodiments, the flow regulator may include an aperture and a source of gas. The aperture may be formed in the outer wall upstream of the separated flow region. The source of gas may be configured to move gas through the aperture into the air-inlet passageway.

In some embodiments, the flow regulator may include a series of axially spaced-apart apertures and a source of gas. The series of axially spaced-apart apertures may be formed in the outer wall upstream of the separated flow region. The source of gas may be configured to move gas through the apertures into the air-inlet passageway.

In some embodiments, the flow regulator may include a series of axially spaced-apart apertures and a source of gas. The series of axially spaced-apart apertures may be formed in an outer splitter surface of the splitter. The source of gas may be configured to move gas through the apertures into the scavenge channel.

In some embodiments, the flow regulator may include a scavenge-channel guide and a source of gas. The scavenge-channel guide may be located in spaced-apart relation to the outer splitter surface to define an aperture therebetween. The source of gas may be configured to move gas through the aperture into the scavenge channel.

According to another aspect of the present disclosure, an air-inlet duct for a gas turbine engine may include an outer wall, an inner wall, and a splitter. The outer wall may be spaced apart from an engine rotation axis. The inner wall may be located between the outer wall and the engine rotation axis. The inner wall and the outer wall may define an air-inlet passageway therebetween. The splitter may be located between the outer wall and the inner wall. The splitter may and including an outer splitter surface cooperating with the outer wall to define an engine channel therebetween and an inner splitter surface cooperating with the inner wall to define a scavenge channel therebetween.

In some embodiments, the air-inlet duct may further include a flow regulator. The flow regulator may be configured to regulate a portion of an inlet flow including particles to cause a size and duration of a separated flow region formed along the outer wall and upstream of a scavenge inlet to the scavenge channel to be minimized so that the particles are collected in the scavenge channel and an amount of particles entering the engine channel are minimized.

These and other features of the present disclosure will become more apparent from the following description of the illustrative embodiments.

BRIEF DESCRIPTION OF THE DRAWINGS

FIG. 2 is an enlarged partial view of the circled region of FIG. 2 showing a first embodiment of an air-inlet duct included in the gas turbine engine;

FIG. 3 a sectional view taken along line 3-3 of FIG. 2 showing a flow regulator including a series of circumferentially spaced apart, inwardly extending flow control devices;

FIG. 4 is a sectional view taken along line 4-4 of FIG. 3 showing that two neighboring flow control devices are arranged to converge toward one another as the devices extend down the air-inlet duct;

DETAILED DESCRIPTION OF THE DRAWINGS

Figure 1:
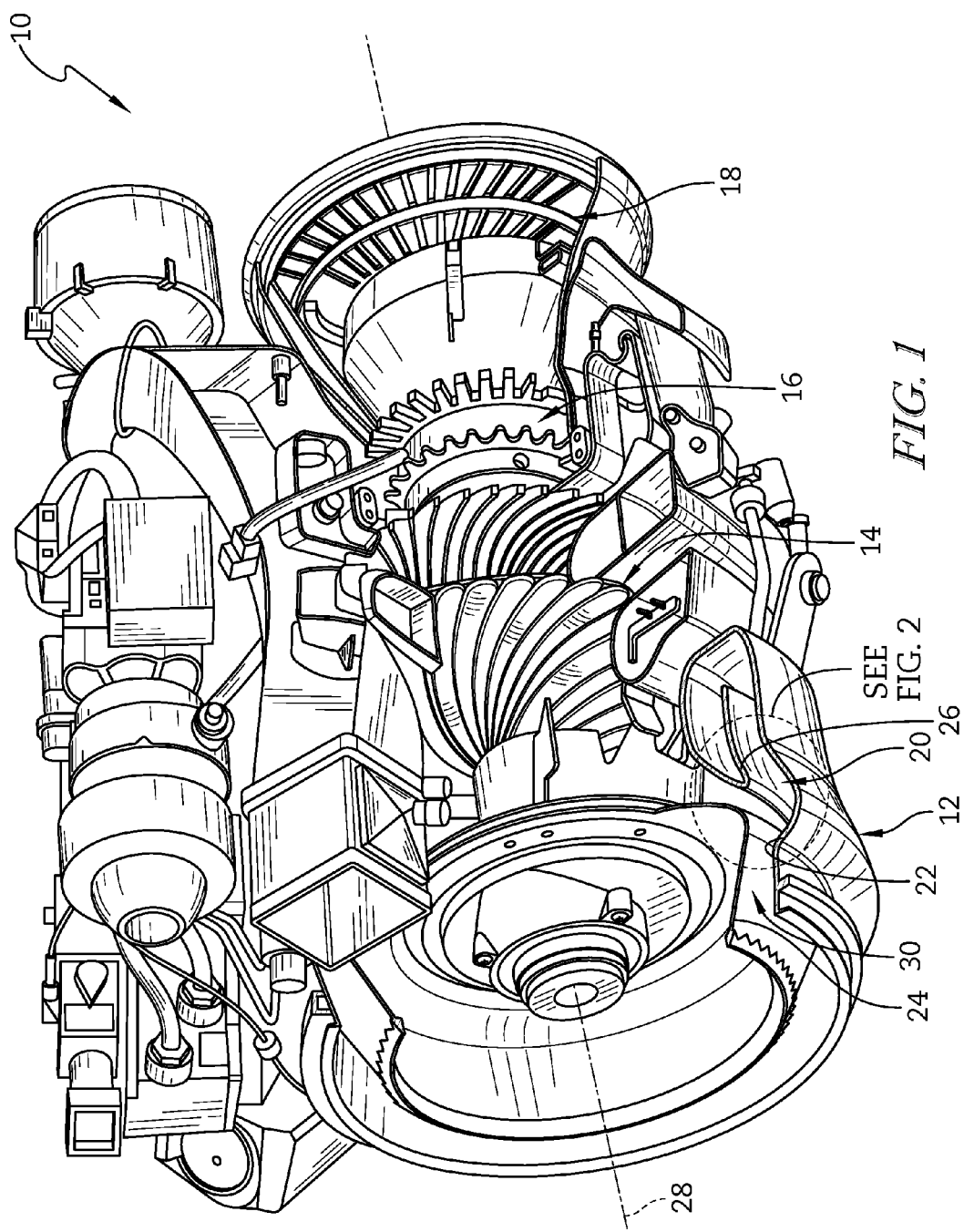
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown, for example, in FIG. 1. The gas turbine engine 10 includes an air-inlet duct 12, one or more compressor sections 14, a combustor section 16, and one more turbine sections 18 as suggested in FIG. 1. Air is drawn into the gas turbine engine through air-inlet duct 12 prior to admission of the air into the one or more compressor sections 14 as suggested in FIGS. 1 and 2. In some environments, particles such as dirt, sand, or liquid water may be entrained in the air and carried into the gas turbine engine 10. The air-inlet duct 12 includes a particle separator 20 which is configured to separate particles from the air to cause clean air free from particles to be delivered to the compressor sections 14 so that damage to the compressor sections 14 and turbine sections 18 is minimized.

Air-inlet duct 12 includes an outer wall 22, an inner wall 24, and a splitter 26 as shown in FIG. 2. The outer wall 22 is located in spaced-apart relation to an engine rotation axis 28 as shown in FIG. 2. The inner wall 24 is located between the outer wall 22 and the engine rotation axis 28. The inner wall 24 and the outer wall 22 cooperate to define an air-inlet passageway 30 therebetween as shown in FIG. 2. The splitter 26 is located between the outer wall 22 and the inner wall 24 and cooperates with the outer wall 22 to establish the particle separator 20.

The splitter 26 includes an outer splitter surface 32 and an inner splitter surface 34 as shown in FIG. 2. The outer splitter surface 32 cooperates with the outer wall 22 to define a scavenge channel 36 therebetween. The inner splitter surface 34 cooperates with the inner wall 24 to define an engine channel 38 therebetween. Engine channel 38 is configured to direct a clean flow 40 of air into the compressor sections 14 of the gas turbine engine 10. Scavenge channel 36 is configured receive and direct a dirty flow 42 including a mixture of air and particles into a scavenge chamber 44 as shown in FIG. 1.

In use, the air-inlet duct 12 draws an inlet flow 46 into the gas turbine engine 10. The inlet flow 46 includes air and entrained particles. The particle separator 20 causes the clean flow 40 and the dirty flow 42 to be established as the inlet flow 46 moves through the air-inlet duct 12. In some instances, the inlet flow 46 detaches from the outer wall 22 and establishes a transient, time-varying, instantaneously-formed, separated flow region 48 upstream of a scavenge inlet 50 which opens into the scavenge channel 36. In the separated flow region 48, the inlet flow 46 detaches from the outer wall 22 and begins to recirculate as suggested in FIG. 2. As a result, particles and air trapped in the separated flow region 48 sometimes, and over very short time intervals, overwhelm the flow moving to the scavenge channel 50 and move into the flow entering the engine channel 38 communicating particles to the compressor sections 14.

The separated flow region 48 includes several different fluid flow and particle dynamics phenomenon. In one example, formation of the separated flow region 48 may be instantaneous and unsteady. The separated flow region 48 may also include particle recirculation which causes particles to flow upstream. In another example, the separated flow region 48 may establish a wall-normal vortex in some instances which causes particles to be drawn out of the separated flow region and the scavenge channel 36 and move into the engine channel 38. Regardless of the specific phenomenon occurring in the separated flow region 48, the air flowing into the scavenge channel 36 may be unsteady.

As shown in FIGS. 2-4, the air-inlet duct 12 further includes a flow regulator 52. The flow regulator 52 is configured to provide means for regulating a portion of an inlet flow 46 including particles to cause an average size, an instantaneous size, an average duration, and an instantaneous duration of the separated flow region 48 formed along the outer wall 22 and upstream of the scavenge inlet 50 to the scavenge channel 36 to be minimized so that particles are collected in the scavenge channel 36 and an amount of particles entering the engine channel 38 is minimized.

The flow regulator 52 includes a series 56 of flow control devices 54 coupled to the outer wall 22 to extend radially inward toward the engine rotation axis 28 as shown in FIGS. 2 and 3. Each flow control device 54 is arranged to lie in spaced-apart circumferential relation to one another as shown in FIG. 3. Each flow control device 54 is located upstream of the separated flow region 48 and arranged to extend toward the separated flow region 48. In some examples, each flow control device 54 may extend up and into to the separated flow region 48. In another example, the separated flow region 48 may be located between the series 56 of flow control devices 54 and the scavenge inlet 50.

Portions of two neighboring flow control devices 54A and 54B are shown, for example, in FIG. 4. The first flow control device 54A is arranged to extend axially away from an air inlet 58 toward the splitter 26 as suggested in FIG. 2. The second flow control device 54B is arranged to extend axially away from the air inlet 58 toward the splitter 26. Together, both flow control devices 54A and 54B converge toward one another as the flow control devices extend downstream. A third flow control device 54C is arranged to locate the second flow control device 54B between the first flow control device 54A and the third flow control device 54C. As an example, the second and third flow control devices 54B, 54C diverge away from one another as the flow control devices extend downstream. In another example, each pair of neighboring flow control devices are parallel to one another and extend inwardly toward the engine rotation axis 28. In another example, the spacing may be generally equal or varied between neighboring flow control devices.

Figure 5:
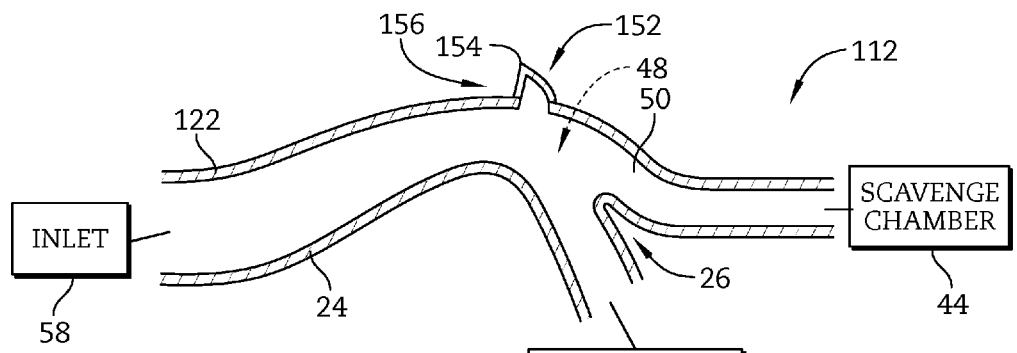
FIG. 5 is a view similar to FIG. 2 showing another embodiment of an air-inlet duct comprising a flow regulator including a series circumferentially spaced apart, outwardly extending flow control devices.

Another embodiment of a flow regulator 152 included in an air-inlet duct 112 in accordance with the present disclosure is shown in FIG. 5. The flow regulator 152 includes a series 156 of flow control devices 154 coupled to an outer wall 122 of the air-inlet duct 112. The flow control devices 154 are arranged to extend radially outwardly away from the engine rotation axis 28 as shown in FIG. 5. Each flow control device 154 is arranged to lie in spaced-apart circumferential relation to one another and to locate the separated flow region 48 between the series 156 of flow control devices 154 and the scavenge inlet 50. The spacing may be generally equal or varied between neighboring flow control devices.

Figure 6:
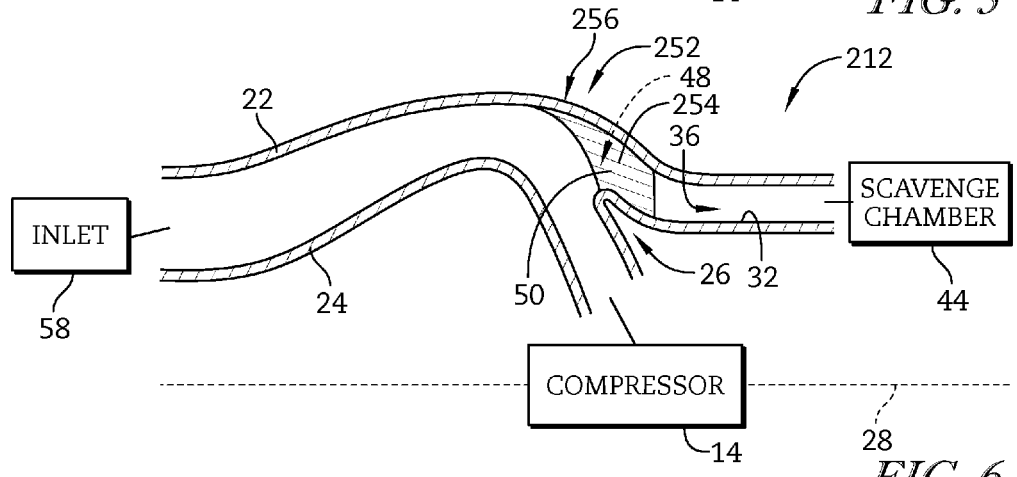
FIG. 6 is a view similar to FIG. 5 showing yet another embodiment of an air-inlet duct comprising a flow regulator including a series of circumferentially spaced apart, axially extending flow control devices that extend into a scavenge channel included in the air-inlet duct.

Another embodiment of a flow regulator 252 included in an air-inlet duct 212 in accordance with the present disclosure is shown in FIG. 6. The flow regulator 252 includes a series 256 of flow control devices 254 arranged to extend between and interconnect the outer wall 22 and the outer splitter surface 32 as shown in FIG. 6. Each flow control device 254 is arranged to extend upstream from the separated flow region 48, through the separated flow region 48, into the scavenge inlet 50, and into the scavenge channel 36. In one example, each flow control device 254 is arranged to lie in spaced-apart circumferential relation to one another. The spacing may be generally equal or varied between neighboring flow control devices.

Figure 7:
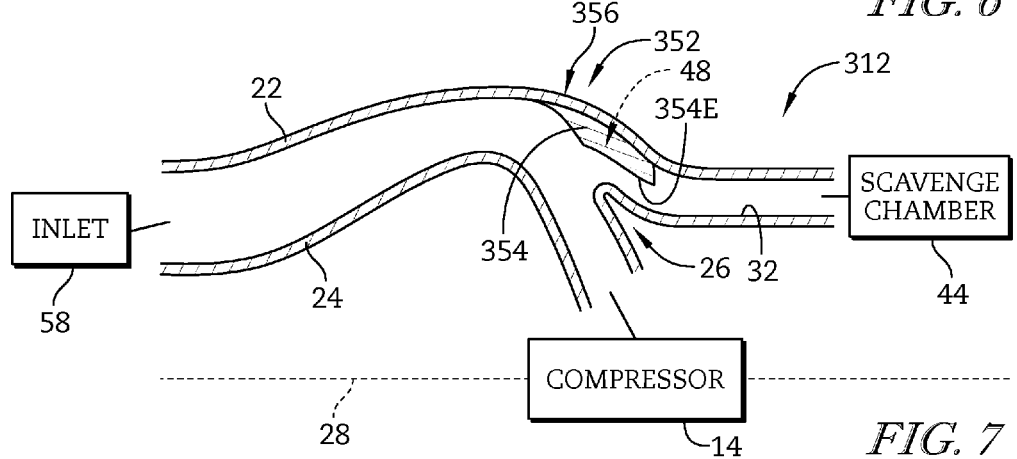
FIG. 7 is a view similar to FIG. 6 showing yet another embodiment of an air-inlet duct comprising a flow regulator including a series of circumferentially spaced apart, axially extending flow control devices that extend into a scavenge channel included in the air-inlet duct.

Still yet another embodiment of a flow regulator 352 included in an air-inlet duct 312 is shown, for example, in FIG. 7. The flow regulator 352 includes a series 356 of flow control devices 354 coupled to the outer wall 22 as shown in FIG. 7. Each flow control device 354 is arranged to extend away from the outer wall 22 toward the engine rotation axis 28. Each flow control device 354 is also arranged to extend upstream from the separated flow region 48, through the separated flow region 48, into the scavenge inlet 50, and into the scavenge channel 36. As shown in FIG. 7, each flow control device 354 includes a lower edge 354E which is located about midway between the outer wall 22 and the outer splitter surface 32 as shown in FIG. 7. In one example, each flow control device 354 is arranged to lie in spaced-apart circumferential relation to one another. The spacing may be generally equal or varied between neighboring flow control devices.

Figure 8:
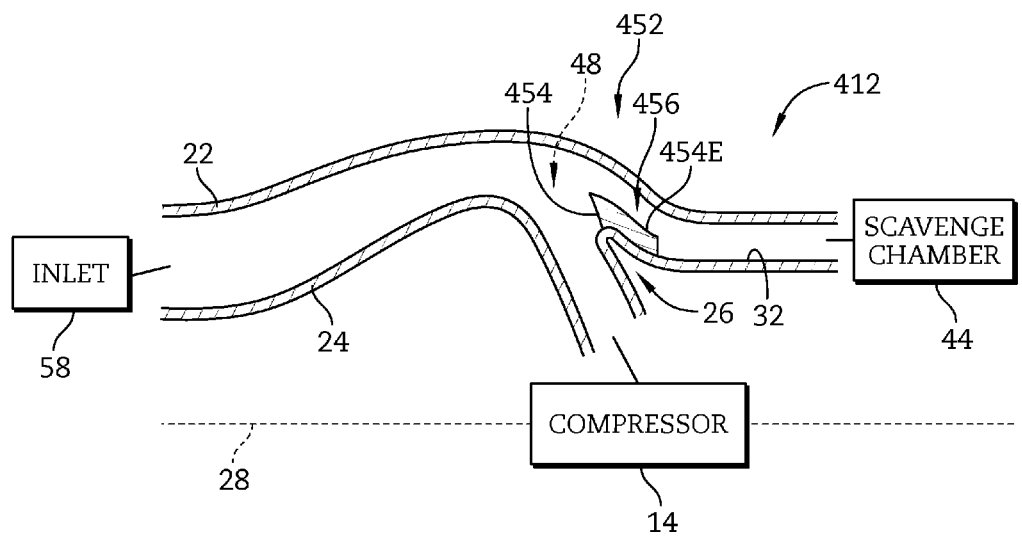
FIG. 8 is a view similar to FIG. 7 showing yet another embodiment of an air-inlet duct comprising a flow regulator including a series of circumferentially spaced apart, axially extending flow control devices that extend into a scavenge channel included in the air-inlet duct.

Another embodiment of a flow regulator 452 included in an air-inlet duct 412 is shown, for example, in FIG. 8. The flow regulator 452 includes a series 456 of flow control devices 454 coupled to the outer splitter surface 32 as shown in FIG. 8. Each flow control device 454 is arranged to extend away from outer splitter surface 32 toward the outer wall 22. Each flow control device 454 is also arranged to extend upstream into the separated flow region 48, through the scavenge inlet 50, and into the scavenge channel 36. As shown in FIG. 8, each flow control device 454 includes an upper edge 454E which is located about midway between the outer wall 22 and the outer splitter surface 32 as shown in FIG. 8. In one example, each flow control device 454 is arranged to lie in spaced-apart circumferential relation to one another. The spacing may be generally equal or varied between neighboring flow control devices.

Figure 9:
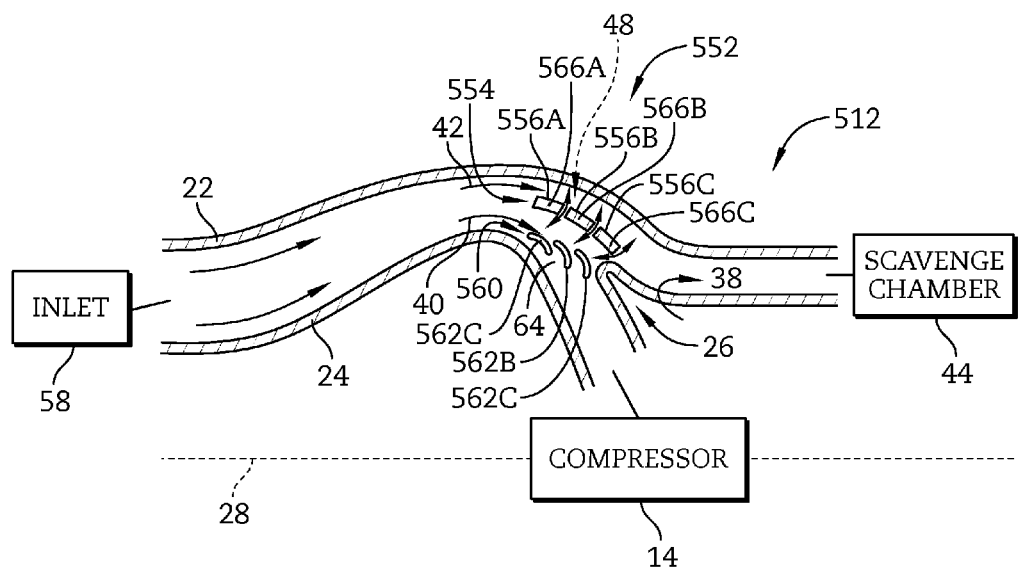
FIG. 9 is a view similar to FIG. 8 showing yet another embodiment of an air-inlet duct comprising a flow regulator including a first set of movable flow diverters located at a scavenge inlet arranged to open into a scavenge channel included in the air-inlet duct and a second set of stationary particle diverters located at an engine inlet arranged to open into an engine channel.

Another embodiment of a flow regulator 552 in accordance with the present disclosure is included in an air-inlet duct 512 as shown in FIG. 9. The flow regulator 552 includes a set 554 of movable flow diverters 556 and a set 560 of stationary particle diverters 562 as shown in FIG. 9. The set 554 of movable flow diverters 556 are located between the outer wall 22 and the splitter 26 and are configured to separate the dirty flow 42 from the clean flow 40 so that the dirty flow is capture in scavenge channel 36 and formation of the separated flow region 48 is disrupted. The set 560 of stationary particle diverters 562 are located in spaced-apart relation to the set of 554 of movable flow diverters 556 and are located at an engine inlet 64 which opens into engine channel 38. The set 560 of stationary particle diverters 562 are configured to deflect any particles which may bounce off of outer wall 22 and originally miss scavenge channel 36. In some instances, the set 560 of stationary particle diverters may disrupt formation of the separated flow region 48.

As shown in FIG. 9, the set 554 of movable flow diverters 556 includes three separate and spaced apart movable flow diverters 556A, 556B, 556C. Each flow diverter 556A, 556B, 556C is rotatable about an associated rotation axis 566A, 566B, 566C as suggested in FIG. 9. A sensor located downstream of engine inlet 64 may detect a size and quantity of particles entering engine channel 38 and move flow diverters 556A, 556B, 556C to minimize particles entering engine channel 38. In one example, flow diverters 556A, 556B, 556C may move together or relative to one another. In another example, the number of the flow diverters and position of the flow diverters may be varied.

The set 560 of stationary particle diverters 562 includes three separate and spaced apart stationary flow diverters 562A, 562B, and 562C as shown in FIG. 9. Each stationary flow diverter 562A, 562B, 562C is arranged to deflect and divert particles which escape the dirty flow 42 and attempt to enter the engine inlet 64. Such particles may have been bouncing off the outer wall 22 or have moved between the movable flow diverters 556A, 556B, 556C due to recirculation or some other phenomenon. In one example, the number of the flow diverters, position, and orientation of the flow diverters may be varied.

In another example, a flow regulator may include only the set 554 of movable flow diverters 556. In another example, a flow regulator may include only the set 560 of stationary particle diverters 562. In still yet another example, a flow regulator may include a first set of movable flow diverters located between the outer wall 22 and the splitter 26 and a second set of movable particle diverters located in spaced-apart relation to the first set of movable flow diverters and are located at the engine inlet 64. In yet another example, a flow regulator may include a first set of stationary flow diverters located between the outer wall 22 and the splitter 26 and a second set of stationary particle diverters located in spaced-apart relation to the first set of stationary flow diverters and are located at the engine inlet 64. In still yet another example, a flow regulator may include any combination of movable or stationary flow diverters, any combination of movable or stationary particle diverters, and any combination of both flow diverters and particle diverters.

Figure 10:
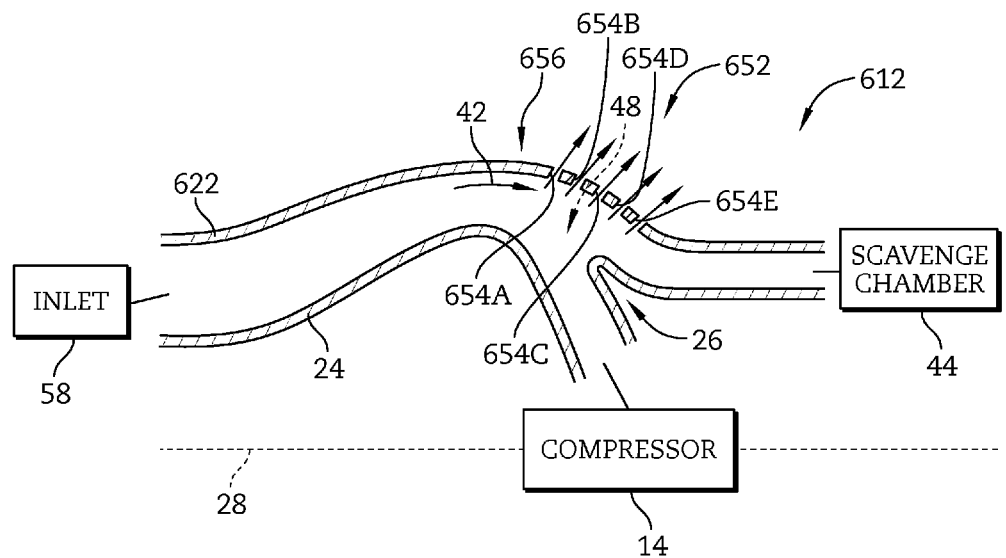
FIG. 10 is a view similar to FIG. 9 showing still yet another embodiment of an air-inlet duct comprising a flow regulator including a series of spaced-apart apertures formed in the air-inlet duct upstream of a scavenge channel included in the air-inlet duct.

Another embodiment of a flow regulator 652 included in an air-inlet duct 612 is shown, for example, in FIG. 10. The flow regulator 652 includes a series 656 of spaced-apart apertures 654. The apertures 654 are spaced-apart axially from one another and formed in the outer wall 622 as shown in FIG. 10. The apertures 654 are located upstream of the scavenge channel 36 at and/or adjacent (e.g., behind) the separated flow region 48. The apertures 654 are configured to allow portions of the dirty flow 42 to move through the outer wall decreasing pressure in the separated flow region 48 thus disrupting formation of the separated flow region 48. The flow regulator 652 includes, for example, several series 656 of apertures 654 which are spaced apart circumferentially from one another.

In one example shown in FIG. 10, the series 656 of apertures 654 includes five apertures 654A, 654B, 654C, 654D, and 654E. In yet another example, the location, number, and size of the apertures may be varied.

In still yet another example, the flow diverter may include only a single aperture. In the example where the flow diverter includes only a single aperture, the aperture may be an elongated slot. The elongated slot may be formed in the outer wall 622 and arranged to extend ahead of the separated flow region 48, adjacent to the separated flow region 48, and through the separated flow region 48 and into the scavenge channel 36. The elongated slot may be arranged to extend axially along the outer wall 622, circumferentially along the outer wall 622, and/or diagonally (e.g., both radially and circumferentially) along the outer wall 622. One or more elongated slots may be formed in the outer wall 622 and spaced apart circumferentially from one another. In another example, the spacing between the elongated slots may be generally equal or varied between neighboring elongated slots.

In yet another example, a flow regulator may include the series 656 of spaced-apart apertures 654 and a vacuum source. The vacuum source may be configured to pull portions of the dirty flow 42 through the apertures 654 to disrupt formation of the separated flow region 48.

Figure 11:
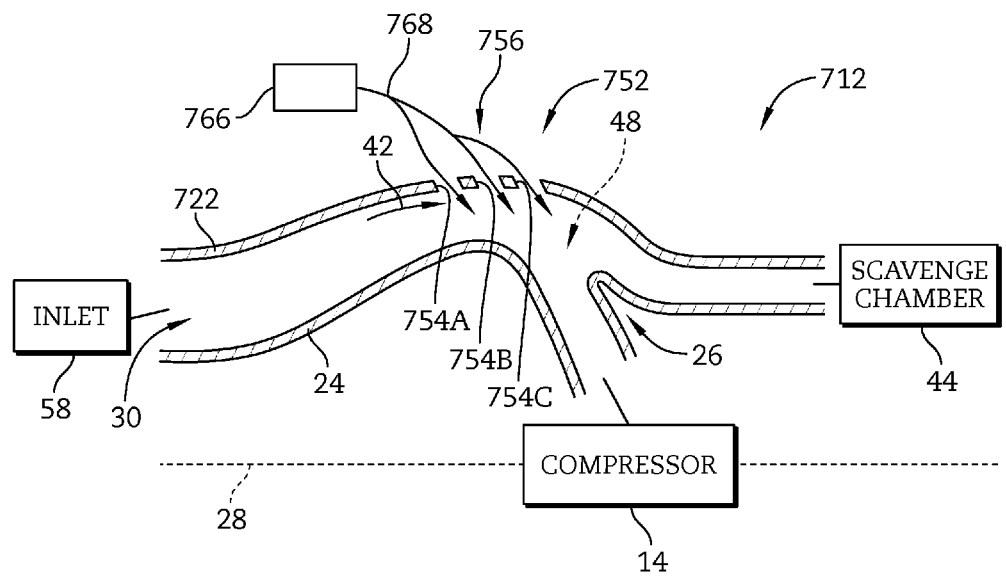
FIG. 11 is a view similar to FIG. 10 showing another embodiment of an air-inlet duct comprising a flow regulator including a series of spaced-apart apertures formed in the air-inlet duct upstream of a scavenge channel included in the air-inlet duct and a source of gas directed through the apertures into an air-inlet passageway formed in the air-inlet duct.

Still yet another embodiment of a flow regulator 752 included in an air-inlet duct 712 is shown, for example, in FIG. 11. The flow regulator 752 includes a series 756 of spaced-apart apertures 754 and a source 766 of gas 768. The apertures 754 are spaced-apart axially from one another and formed in the outer wall 722 as shown in FIG. 11. The apertures 754 are located upstream of the separated flow region 48 prior to formation of the engine inlet 64. The source 766 of gas 768 is configured to force gas 768 (e.g. pressurized air) through each of the apertures 754 into the air-inlet passageway 30 to disrupt formation of the separated flow region 48 through introduction of gas 768 moving an angle relative to a flow path of the dirty flow 42. The flow regulator 752 includes, for example, several series 756 of apertures 754 which are spaced apart circumferentially from one another.

In one example shown in FIG. 11, the series 756 of apertures 754 includes three apertures 754A, 754B, and 754C. In another example, the flow diverter may include only a single aperture. In another example, the location, number, and size of the apertures may be varied. In still yet another example, the velocity, flow rate, temperature, and make-up of the gas 768 may be varied.

Figure 12:
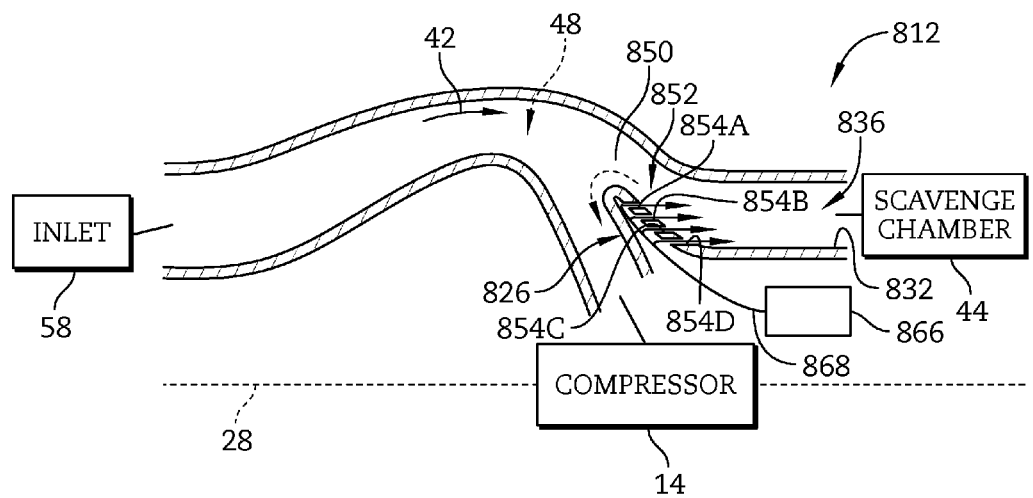
FIG. 12 is a view similar to FIG. 11 showing yet another embodiment of an air-inlet duct comprising a flow regulator including a series of axially spaced-apart apertures formed in a scavenge channel and a source of gas directed through the apertures into the scavenge channel.

Still yet another embodiment of a flow regulator 852 included in an air-inlet duct 812 is shown, for example, in FIG. 12. The flow regulator 852 includes a series 856 of spaced-apart apertures 854 and a source 866 of gas 868. The apertures 854 are spaced-apart axially from one another and formed in an outer splitter surface 832 of a splitter 826 included in the air-inlet duct 812 as shown in FIG. 11. The apertures 854 are located downstream of a scavenge inlet 850 and in a scavenge channel 836. The source 866 of gas 868 is configured to force gas 868 through each of the apertures 854 into the scavenge channel 836 to increase velocity of the dirty flow 42 decreasing pressure in scavenge channel 836 and disrupting formation of the separated flow region 48. The flow regulator 852 includes, for example, several series 856 of apertures 854 which are spaced apart circumferentially from one another.

In one example shown in FIG. 12, the series 856 of apertures 854 includes four apertures 854A, 854B, 854C, and 854D. In another example, the flow diverter may include only a single aperture. In another example, the location, number, and size of the apertures may be varied. In still yet another example, the velocity, flow rate, temperature, and make-up of the gas 868 may be varied.

Figure 13:
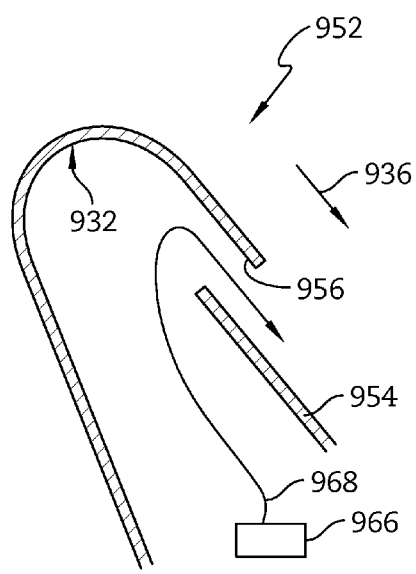
FIG. 13 is an enlarged partial elevation view of a portion of another embodiment of an air-inlet duct comprising a flow regulator including an aperture formed in a scavenge channel and a source of gas directed through the aperture into the scavenge channel.

Another embodiment of a flow regulator 952 included in an air-inlet duct is shown, for example, in FIG. 13. The flow regulator 952 includes a scavenge-channel guide 954 located in spaced-apart relation to an outer splitter surface 932 as shown in FIG. 13. Scavenge-channel guide 954 is located radially between the outer splitter surface 932 and the engine rotation axis 28. As a result, an aperture 956 is defined between outer splitter surface 932 and scavenge-channel guide 954 and opens into a scavenge channel 936. Scavenge channel 936 is defined by scavenge-channel guide 954, outer splitter surface 932, and outer wall 22 as shown in FIG. 13.

The source 966 of gas 968 is configured to force gas 968 through the aperture 954 into the scavenge channel 936 to increase velocity of the dirty flow 42 decreasing pressure in scavenge channel 936 and disrupting formation of the separated flow region 48. The flow regulator 952 includes, for example, several apertures 954 which are spaced apart circumferentially from one another. In another example, the location and size of the aperture may be varied. In still yet another example, the velocity, flow rate, temperature, and make-up of the gas 968 may be varied.

Figure 14:
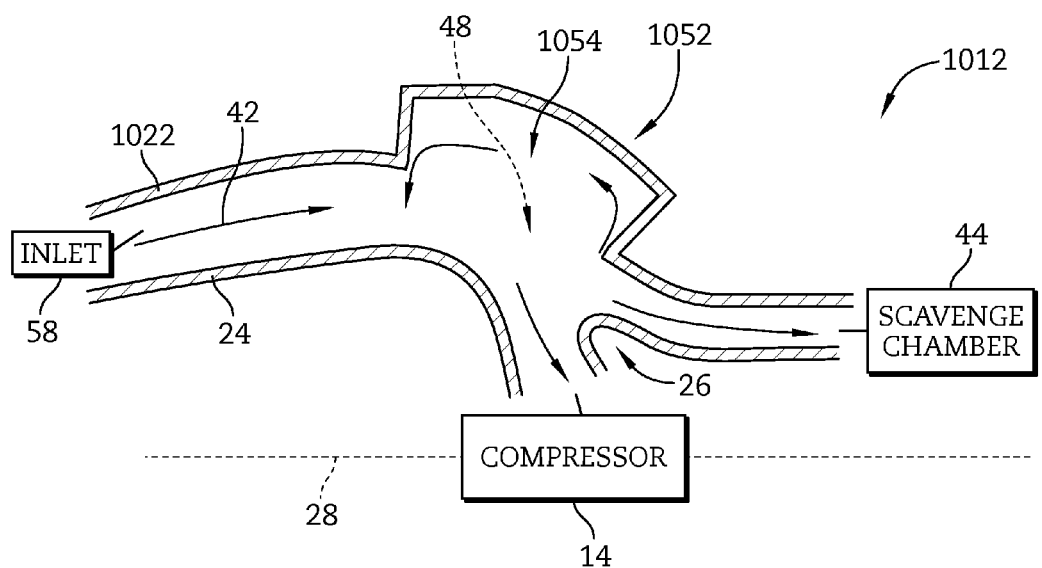
FIG. 14 is a view similar to FIG. 5 showing another embodiment of an air-inlet duct comprising a flow regulator including a series circumferentially spaced apart, outwardly extending slots formed in the air-inlet duct.

Another embodiment of a flow regulator 1052 included in an air-inlet duct 1012 is shown, for example, in FIG. 14. The flow regulator 1052 includes a series of spaced-apart slots 1054. The slots 1054 are spaced-apart circumferentially from one another and formed in the outer wall 1022 as shown in FIG. 14. The slots 1054 are located upstream of the scavenge channel 36 at and/or adjacent (e.g., behind or radially outward from) the separated flow region 48. The slots 1054 are configured to allow portions of the dirty flow 42 to move radially outward into the axially extending slot.1054. Portions of the dirty flow 42 move away from the scavenge channel 42 toward the inlet in slot 1054 where the portion exits upstream. As a result, the structure and extent of the separated flow region 48 is altered to maximize particulate separation.

In one example shown in FIG. 13, the series of slots 1054 are arranged to extend axially. In yet another example, the location, number, and size of the slots may be varied. In yet another example, the orientation of the slots may be varied such that the slots extend both axially and circumferentially.

While several embodiments of flow regulators 54, 154, 254, 354, 454, 554, 654, 754, 854, 954, and 1054 are discussed herein, any combination of flow regulators 54, 154, 254, 354, 454, 554, 654, 754, 854, 954, and 1054 may be used together or separately in an air-inlet duct. Any flow regulator 54, 154, 254, 354, 454, 554, 654, 754, 854, 954, 1054 or combination thereof, may be used with an air-inlet duct in which an engine channel is defined by an outer wall and an outer splitter surface of the splitter and a scavenge channel is defined by an inner wall and an inner splitter surface of the splitter. Reference is hereby made to U.S. Pat. No. 5,139,545 issued on Aug. 18, 1992 and titled AIR INTAKES FOR GAS TURBINE ENGINES for disclosure relating such air-inlet ducts where the engine channel is defined by the outer wall and the outer splitter surface of the splitter and the scavenge channel is defined by the inner wall and the inner splitter surface of the splitter.

A method of removing particles from air moving through an air-inlet duct included in a gas-turbine engine includes several steps. The method begins with providing an inlet flow including particles to an air-inlet duct of a gas-turbine engine. The method further includes regulating a portion of the inlet flow including the particles to cause a size and duration of a separated flow region formed along an outer wall of the air-inlet duct and upstream of an inlet to a scavenge chamber to be minimized. The method further includes separating the inlet flow into a dirty flow including substantially all the particles and a clean flow lacking substantially all the particles. The method further includes directing the dirty flow to the scavenge chamber. The method further includes directing the clean flow to a compressor included in the gas-turbine engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for a gas-turbine engine, the air-inlet duct comprising
    an outer wall spaced apart from an engine rotation axis,
    an inner wall located between the outer wall and the engine rotation axis, the inner wall and the outer wall defining an air-inlet passageway therebetween,
    a splitter located between the outer wall and the inner wall and including an outer splitter surface cooperating with the outer wall to define a scavenge channel therebetween and an inner splitter surface cooperating with the inner wall to define an engine channel therebetween, and
    a flow regulator configured to regulate a portion of an inlet flow including particles to cause a size and duration of a separated flow region formed along the outer wall and upstream of a scavenge inlet to the scavenge channel to be minimized so that the particles are collected in the scavenge channel and an amount of particles entering the engine channel are minimized,
    wherein the flow regulator includes a series of flow control devices, each flow control device coupled to the outer wall to extend radially inward from the outer wall, and terminating at a free end exterior to the engine rotation axis and the inner wall, and each flow control device has a pair of parallel sides and is arranged to lie in spaced-apart circumferential relation to one another and located upstream of the separated flow region.

2. The air-inlet duct of claim 1, wherein a first flow control device included in the series of flow control devices is arranged to extend downstream toward the splitter, a second flow control device included in the series of flow control devices is arranged to lie adjacent to the first flow control device and to extend downstream toward the splitter, and the first and second flow control devices are configured to converge toward one another as the first and second flow control devices extend downstream toward the splitter.

3. A method of removing particles from air moving through an air-inlet duct included in a gas-turbine engine, the method comprising the steps of
    providing an inlet flow including particles to an air-inlet duct of the gas-turbine engine,
    regulating a portion of the inlet flow including the particles to cause a size and duration of a separated flow region formed along an outer wall of the air-inlet duct and upstream of an inlet to a scavenge chamber to be minimized,
    separating the inlet flow into a dirty flow including substantially all the particles and a clean flow lacking substantially all the particles,
    directing the dirty flow to the scavenge chamber, and
    directing the clean flow to a compressor included in the gas-turbine engine,
    wherein the regulating is performed via a flow regulator which includes a series of flow control devices, each flow control device coupled to the outer wall to extend radially inward from the outer wall, and terminating at a free end exterior to an engine rotation axis and an inner wall of the air inlet duct, and each flow control device has a pair of parallel sides and is arranged to lie in spaced-apart circumferential relation to one another and located upstream of the separated flow region.

4. The air-inlet duct of claim 1, further comprising compressor sections, wherein the engine channel is configured to direct a clean flow of air into the compressor sections and the scavenge channel coupled to a scavenge chamber and is configured to receive a dirty flow and direct the dirty flow to the scavenge chamber.

* * * * *